United States Patent
Nerone

(10) Patent No.: US 9,210,758 B2
(45) Date of Patent: Dec. 8, 2015

(54) BOOST CONVERTER OF DRIVER CIRCUIT WITH THERMAL COMPENSATION

(71) Applicant: General Electric Company, Schenectady, NY (US)

(72) Inventor: Louis Robert Nerone, Brecksville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 318 days.

(21) Appl. No.: 13/652,619

(22) Filed: Oct. 16, 2012

(65) Prior Publication Data

US 2014/0103820 A1 Apr. 17, 2014

(51) Int. Cl.
*H05B 33/08* (2006.01)

(52) U.S. Cl.
CPC ........ *H05B 33/0848* (2013.01); *H05B 33/0815* (2013.01); *H05B 33/0854* (2013.01)

(58) Field of Classification Search
CPC .................................................. H05B 33/0848
USPC ...................................................... 315/185 R
See application file for complete search history.

(56) References Cited

U.S. PATENT DOCUMENTS

| | | |
|---|---|---|
| 5,345,192 A | 9/1994 | Green |
| 7,656,304 B2 | 2/2010 | Balakrishnan et al. |
| 7,990,070 B2 | 8/2011 | Nerone |
| 8,183,658 B2 | 5/2012 | Meadows et al. |
| 8,232,735 B2 | 7/2012 | Shteynberg et al. |
| 2008/0273331 A1* | 11/2008 | Moss et al. ................... 362/294 |
| 2009/0021185 A1 | 1/2009 | Ng |
| 2009/0315612 A1 | 12/2009 | Hurtz et al. |
| 2011/0080118 A1 | 4/2011 | Daniel |
| 2012/0139420 A1 | 6/2012 | Lee et al. |
| 2012/0242252 A1* | 9/2012 | Yang et al. ................... 315/307 |

OTHER PUBLICATIONS

L4976, Apr. 2007, STMicroelectronics, p. 3.*
Power Supply Topologies, 2011, Texas Instruments, p. 1.*
Widlar et al., "Dynamic Safe-Area Protection for Power Transistors Employs Peak—Temperature Limiting", IEEE Journal of Solid State Circuits, pp. 1-10, vol. 22, Issue 1, Feb. 1987.

* cited by examiner

*Primary Examiner* — Douglas W Owens
*Assistant Examiner* — Jonathan Cooper
(74) *Attorney, Agent, or Firm* — GE Global Patent Operation; Peter T. DiMauro

(57) ABSTRACT

A circuit for providing thermal compensation for a driver circuit used to drive light emitting diodes (LEDs) is provided. The driver circuit can include a rectifier circuit configured to rectify an AC power source into a DC power source providing a DC source voltage. The driver circuit can further include a boost circuit configured to boost the DC source voltage to provide a drive voltage for driving the light emitting diodes. The boost circuit can include a switching element that is controlled based at least in part on a current sense circuit having a sense transistor. A thermal tracking transistor is provided as part of the reference to the sense circuit.

20 Claims, 4 Drawing Sheets

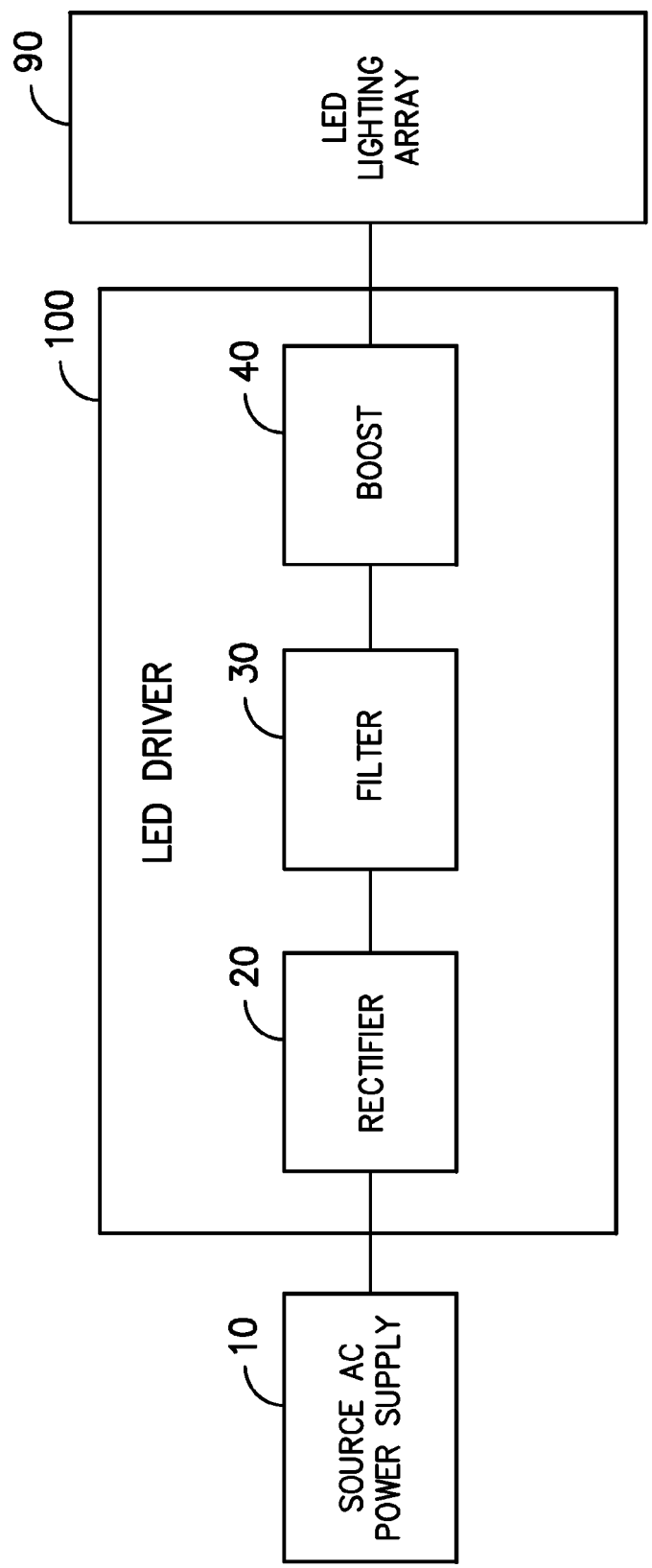
FIG. -1-

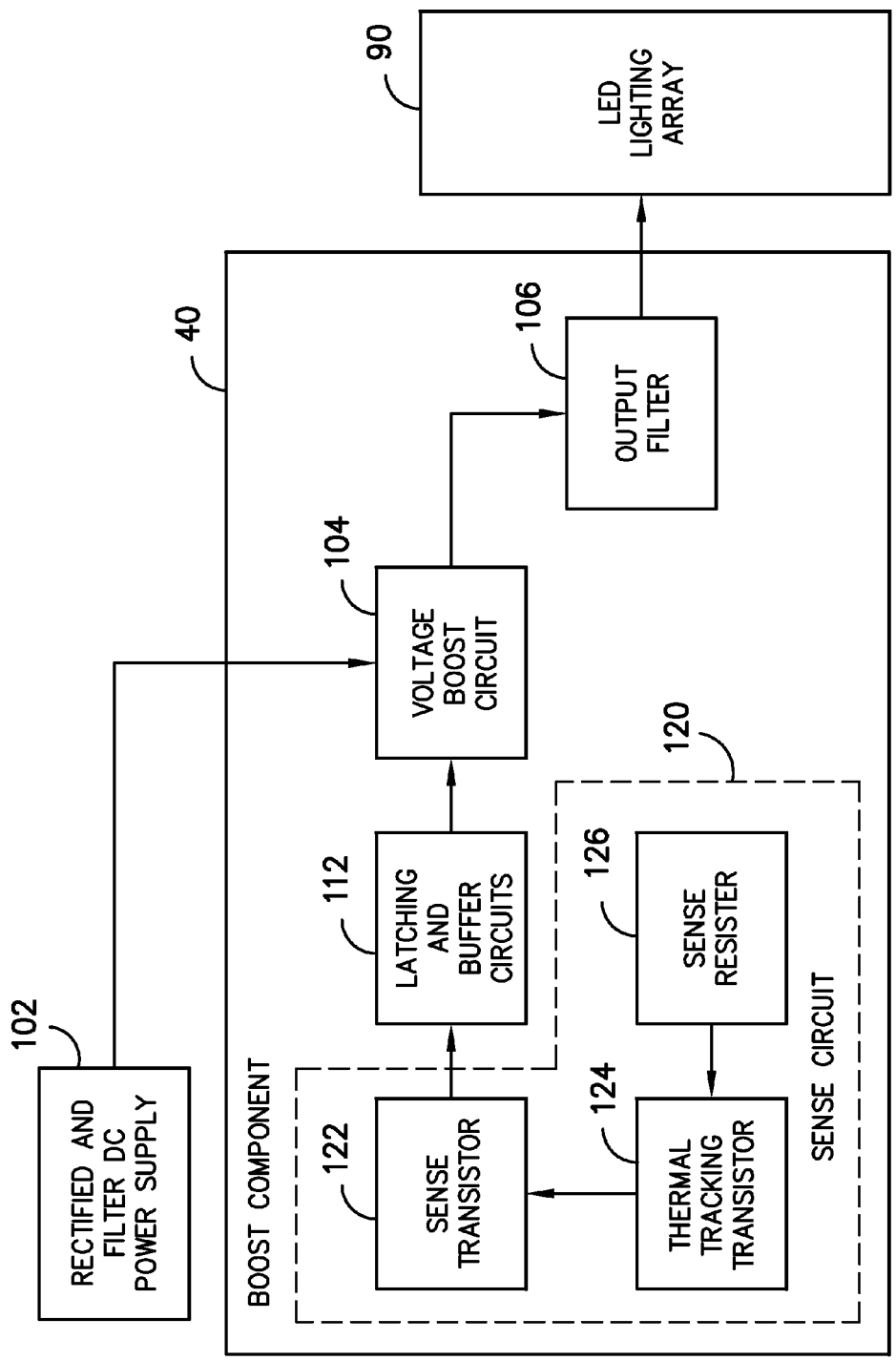
FIG. -2-

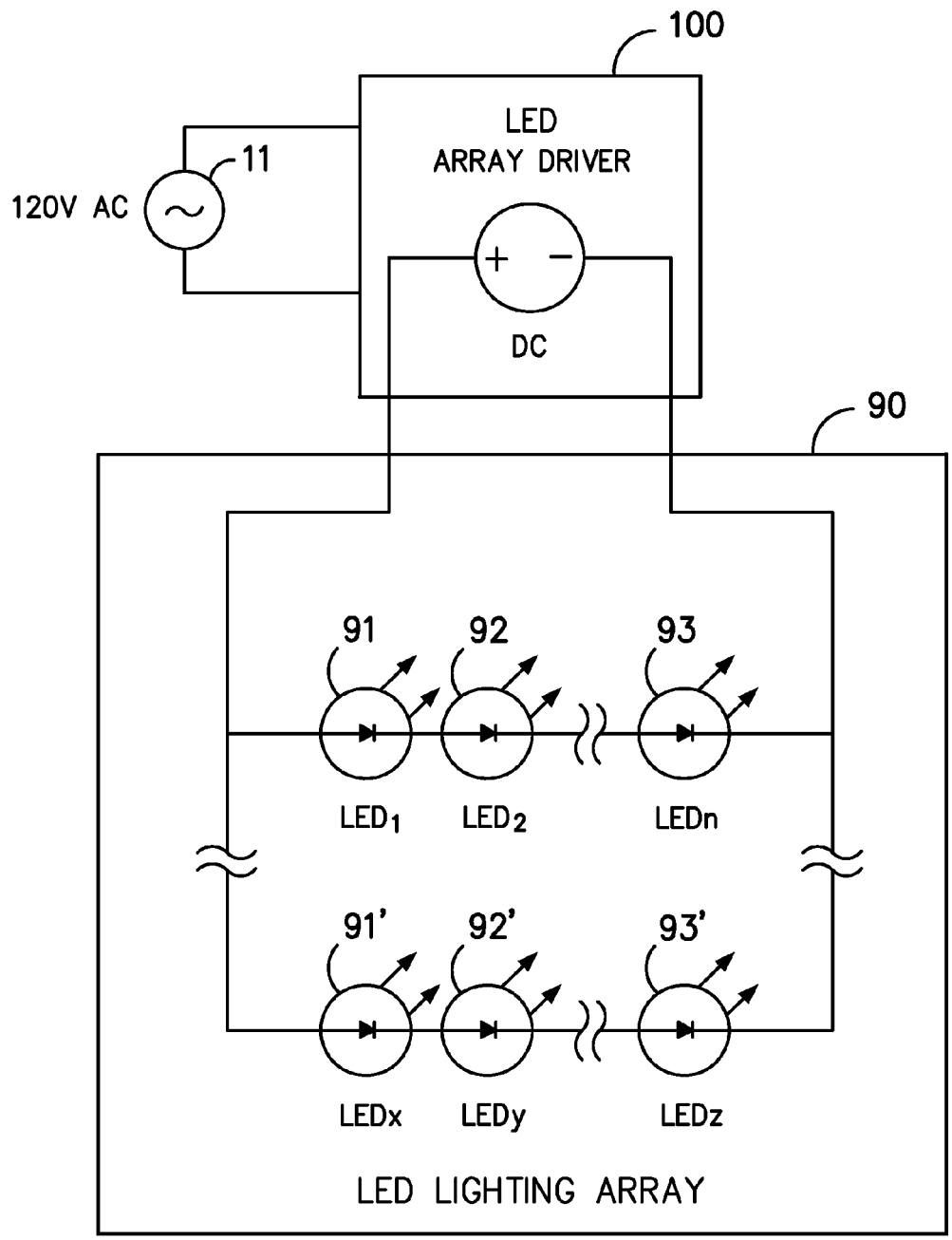
FIG. -3-

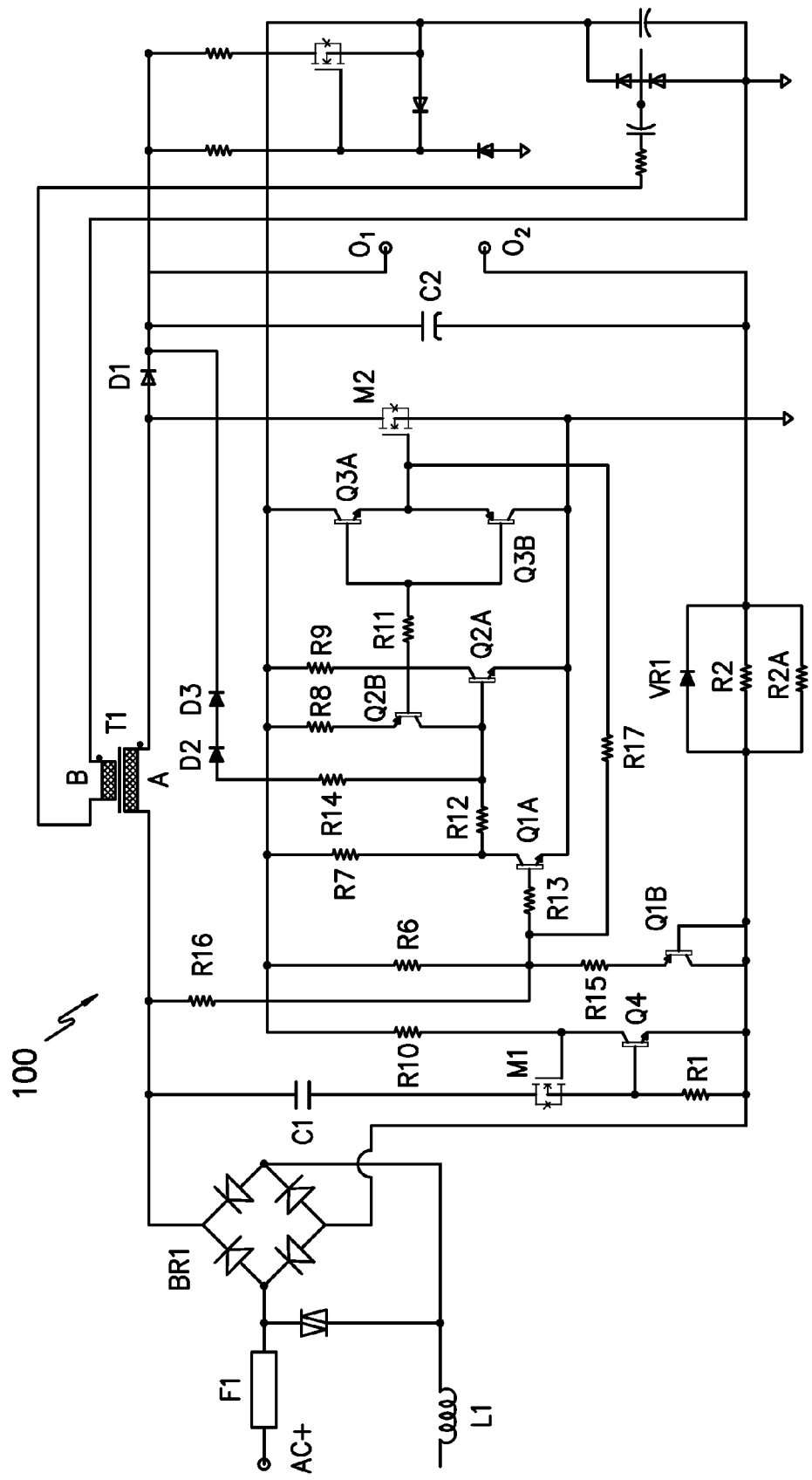
FIG. -4-

BOOST CONVERTER OF DRIVER CIRCUIT WITH THERMAL COMPENSATION

FIELD OF THE INVENTION

The present disclosure relates to a driver circuit for driving light emitting diodes (LEDs), and more particularly to providing thermal compensation for a driver circuit for driving LEDs.

BACKGROUND OF THE INVENTION

A light emitting diode (LED) can be used in various lighting applications including residential, commercial, and industrial lighting systems. In typical LED lighting systems, an array of LEDs are coupled in series to produce a desired luminescence output. In a residential LED lighting system, a typical 120 VAC power source needs to be converted to DC power to drive the LED array. In conventional LED lighting systems, a driving circuit includes a rectifier to convert the AC power to a DC voltage and a boost converter to increase the converted DC voltage to a higher DC voltage. The boost converter can include a switching element that is driven by a current sense circuit. However, the current detected in the current sense circuit is susceptible to drift due to thermal changes in and around the driving circuit.

Thermal compensation in the driving circuit has been addressed using a thermistor. In particular, a thermistor can be used in conjunction with the current sense circuit to compensate for changes in current drift. However, tracking the changes in the current drift using a thermistor is inaccurate over a wide range of temperatures due to several factors, including the materials of the circuit elements. In addition, the use of the thermistor is relatively expensive.

Thus, a need exists for an improved LED driver circuit. A system and method that provides improved thermal compensation of a current sense circuit used in the LED driver would be particularly useful.

BRIEF DESCRIPTION OF THE INVENTION

Aspects of the present disclosure are directed to providing thermal compensation for a driver circuit used to drive light emitting diodes (LEDs). Embodiments of the present disclosure offer one or more differences and/or advantages over prior systems and methods. For example, aspects of the present disclosure are directed to the integration of a p-n junction into a reference of a current sense circuit used to control switching of a voltage boost circuit driving the LEDs. In particular, a thermal tracking transistor is provided as part of the reference to a sense transistor used in the sense circuit so that as temperature changes, the changes in a p-n junction of the thermal tracking transistor compensate for changes in the base-emitter junction of the sense transistor. As a result, excellent thermal tracking can be provided for the current sense circuit with reduced complexity and reduced cost when compared to known thermal compensation systems for LED driver circuits.

For instance, one exemplary aspect of the present disclosure is directed to a driver circuit for an LED assembly. The driver circuit includes a rectifier circuit configured to rectify an AC power source into a DC power source providing a DC source voltage. The driver circuit further includes a voltage boost circuit configured to boost the DC source voltage to a drive voltage for the LED assembly. The driver circuit further includes a current sense circuit configured to drive a switching element of the voltage boost circuit. The current sense circuit includes a sense transistor configured to control switching of the switching element based on a voltage across at least one sense resistor. The sense circuit includes a thermal tracking transistor coupled to the sense transistor.

Another exemplary aspect of the present disclosure is directed to a driver circuit for driving a light source. The driver circuit includes a rectifier circuit configured to rectify an AC power source into a DC power source providing a DC source voltage. The driver circuit further includes a filter configured to filter the DC source voltage, and a voltage boost circuit configured to boost the DC source voltage to a drive voltage for the light source. The voltage boost circuit includes a switching element, an inductive element (e.g. a transformer winding), and a diode. The driver circuit further includes a current sense circuit configured to drive the switching element of the voltage boost circuit. The current sense circuit includes a sense transistor configured to control switching of the switching element based on a voltage across at least one sense resistor. The sense transistor has a reference input coupled to a base of the sense transistor. The reference input includes the sense resistor and a thermal tracking transistor. The thermal tracking transistor is configured to compensate for current drift resulting from temperature in a base-emitter junction of the sense transistor.

Yet another exemplary aspect of the present disclosure is directed to a light emitting diode (LED) assembly. The assembly includes an LED array having a plurality of LEDs connected in series for providing illumination. The assembly further includes a driver circuit for driving the LED array. The driver circuit includes a rectifier circuit configured to rectify an AC power source into a DC power source providing a DC source voltage. The driver circuit further includes a filter configured to filter the DC source voltage, and a voltage boost circuit configured to boost the DC source voltage to a drive voltage for the LED array. The driver circuit further includes a current sense circuit configured to drive a switching element of the voltage boost circuit. The current sense circuit includes a sense transistor configured to control switching of the switching element based on a voltage across at least one sense resistor. The sense circuit includes a thermal tracking transistor coupled to a reference input of the sense circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

Reference is now made briefly to the accompanying drawings in which:

FIG. 1 depicts a simplified block diagram of an exemplary lighting system according to an exemplary embodiment of the present disclosure;

FIG. 2 depicts a block diagram of an exemplary lighting system according to an exemplary embodiment of the present disclosure;

FIG. 3 depicts an exemplary LED array being driven by a driver circuit according to an exemplary embodiment of the present disclosure; and FIG. 4 provides a schematic diagram of an exemplary driver circuit according to an exemplary embodiment of the present disclosure.

DETAILED DESCRIPTION OF THE INVENTION

Generally, this disclosure is directed to providing thermal compensation for a driver circuit used to drive light emitting diodes (LEDs). The driver circuit can include a rectifier circuit configured to rectify an AC power source into a DC power source providing a DC source voltage. The driver circuit can further include a boost circuit configured to boost the DC source voltage to provide a drive voltage for driving the light emitting diodes. The boost circuit can include a switching element that is controlled based at least in part on a current sense circuit. In particular, the current sense circuit can include a sense transistor configured to control switching (e.g. a duty cycle) of the switching element based on a voltage across at least one sense resistor.

According to aspects of the present disclosure, a thermal tracking transistor is provided as part of the reference to the sense circuit so that as temperature changes, changes in characteristics of a p-n junction of the thermal tracking transistor compensate for changes in a base-emitter junction of the sense transistor. In this manner, the subject matter of the present disclosure provides for excellent thermal compensation of sense circuitry used in a driver circuit at reduced cost.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts a simplified block diagram showing the primary components of a lighting system including an LED driver circuit 100 for driving an LED lighting array 90. Primarily, the driver circuit 100 will include a rectifier circuit 20 for rectifying an AC source received from a source AC power supply 10, such as a 120 VAC residential power supply. The driver circuit 100 further includes a filter 30 configured to filter electromagnetic interference and/or to reduce total harmonic distortion of the driver circuit 100. The driver circuit 100 includes a boost component 40 configured to boost the rectified and filtered power for providing a constant current to the LED lighting array 90.

FIG. 2 depicts a simplified block diagram of the boost component 40 of the driver circuit 100 according to an exemplary embodiment of the present disclosure. The boost component 40 includes a voltage boost circuit 104 for boosting the rectified and filtered DC power 102 and for controlling the output current to the LED array 90. As discussed in detail below, the voltage boost circuit 104 can include a switching element, (e.g. a field effect transistor or other suitable switching element) that is controlled to provide a desired current output for driving the LED array 90. The switching element can be turned on and off to alternately charge and discharge an inductive element, such as a transformer winding. When the switching element of the voltage boost circuit 104 is turned on, the inductive element can be charged. When the switching element of the voltage boost circuit 104 is turned off, the inductive element can be discharged into the LED array while boosting the load voltage provided to the LED array 90.

The voltage boost circuit 104 is driven by a current sense circuit 120 via latching and buffer circuits 112 based on a voltage across at least one sense resistor 126. The current sense circuit 120 includes as part a reference input a voltage across at least one sense resistor 126, which can be indicative of the current provided by the voltage boost circuit 104. When the voltage across the at least one sense resistor 126 is less than a threshold, a sense transistor 122 can be provide a suitable drive signal via latching and buffer circuits 112 to turn on the switching element of the voltage boost circuit. When the voltage across the at least one sense resistor 126 exceeds a threshold, the sense transistor 122 can provide a signal to the switching element to turn off the switching element of the voltage boost circuit.

According to aspects of the present disclosure, a thermal tracking transistor 124 is provided as part of the current sense circuit 120 to provide thermal compensation for the sense transistor 122. In particular, the thermal tracking transistor is provided in the reference input to the sense transistor 122 such that changes resulting from temperature in a p-n junction of the thermal tracking transistor 124 compensate for changes resulting from temperature in a base-emitter junction of the sense transistor 122. In one aspect, the thermal tracking transistor 124 and the sense transistor 122 can be the same type of transistor (e.g. npn bipolar junction transistors) and can implemented on the same surface mount device. In this way, improved thermal compensation of the sense transistor 122 can be provided due to the similar operating characteristics and exposure to temperature of the p-n junction of the thermal tracking transistor 124 and the base-emitter junction of the sense transistor 122.

An output filter 106 can be provided to filter ripple currents provided by the voltage boost circuit 104. The boost circuit 40 can include other components that are not illustrated in FIG. 2. For instance, the boost circuit 40 can include circuits and/or components to improve compatibility with dimmer circuits, to provide output protection, to reduce total harmonic distortion, and to provide other desired functionality.

FIG. 3 depicts a diagram of an exemplary LED assembly according to an exemplary embodiment of the present disclosure. The exemplary LED assembly includes an LED driver circuit 100 driving an LED array 90 having a plurality of LEDs, 91, 92 . . . 93 connected in one series string and another plurality of LEDs 91', 92', . . . 93' connected in another series string, where a plurality of such series strings of LEDs are shown connected in parallel.

Various numbers of LEDs could be provided in each series string depending on the output voltage of the LED driver circuit 100 and also depending on the voltage drop across the LEDs. For instance, where the voltage drop across each LED is about 3V, and the output of the driver circuit 100 is about 200V, a series string could have about 66 LEDs. Any number of LED strings can be connected in parallel depending on the total light output desired. Each additional string connected in parallel increases the current that much be provided by the driver circuit 100 by an integer multiple amount, thereby increasing the required power capability of the driver circuit 100 and its components.

FIG. 4 depicts a schematic diagram of an LED driver circuit 100 according to an exemplary embodiment of the present disclosure. The driver circuit 100 can receive AC power (e.g. 120 VAC power) through fuse F1 and convert the AC power to DC power suitable for driving an LED array or other light source via output terminals O1 and O2. The rectifier is provided by the bridge rectifier BR1. The input filter is provided by capacitor C1, resistor R1, inductor L1. As illustrated, the filter can include field effect transistor M1 along with its driving circuit (including bipolar junction transistor Q4) to limit the filter surge current to provide improved compatibility with triac dimmers.

The voltage boost circuit is provided by the transformer winding T1A, the switching element (field effect transistor) M2, and diode D1. In a particular implementation, field effect transistors M1 and M2 can be provided on the same surface mount device. The field effect transistor M2 is controlled by a current sense circuit which provides a gate signal to the gate of the field effect transistor M2 via a latching circuit and a buffer circuit. The latching circuit is provided by bipolar junction transistors Q2A and Q2B and accompanying resistors R12, R8, R9, and R11. The bipolar junction transistors Q2A and Q2B can be provided on the same surface mount device. The buffer circuit is provided by bipolar junction transistors Q3A and Q3B. The bipolar junction transistors Q3A and Q3B can also be provided on the same surface mount device.

Basically, the current sense circuit drives field effect transistor M2 to switch on and off based on a voltage detected across sense resistors R2 and R2A. Transformer winding T1A Charges while M2 is on and discharges into an LED array coupled to the output terminals O1 and O2 while M2 is off, boosting the load voltage provided to the LED array. The latching and buffer circuits can prevent M2 from drawing too much current during switching.

The sense circuit includes a sense transistor Q1A and the sense resistors R2, R2A. The sense transistor Q1A can be a bipolar junction transistor, such as an npn bipolar junction transistor, having a base, a collector, and an emitter. A resistor R13 is coupled to the base of the sense transistor Q1A. The base of the sense transistor Q1A receives an AC input component through resistor R16 and a DC input component through resistor network R6, R15. Hysteretic control for the voltage boost circuit can be provided by feedback through resistor R17 to the base of Q1A.

The sense transistor Q1A also includes a reference input provided to the base of the sense transistor Q1A. The reference input can be coupled to the sense resistors R2, R2A. Diode VR1 is coupled in parallel with sense resistors R2 and R2A to provide surge protection.

According to aspects of the present disclosure, a thermal tracking transistor Q1B is provided as part of the reference to sense transistor Q1A. The thermal tracking transistor Q1B can be a bipolar junction transistor having a base, a collector, and an emitter. The base and the collector of the thermal tracking transistor Q1B are shorted together. As a result, a base-emitter p-n junction is provided in the reference to the sense transistor Q1A.

The base-emitter p-n junction of the thermal tracking transistor Q1B provides thermal compensation for the sense transistor Q1A. In particular, changes in temperature that induce a change in the operating characteristics of the base-emitter of the sense transistor Q1A (e.g. base-emitter current drift) also induce a change in the p-n junction provided by the thermal tracking transistor Q1B. This change in the p-n junction in the reference to the sense transistor Q1A provides for improved thermal tracking of the sense transistor Q1A, reducing current drift in the driver circuit 100.

The thermal tracking transistor Q1B is illustrated as a pnp bipolar junction transistor in FIG. 4. In an alternative embodiment, the thermal tracking transistor Q1B can also be an npn bipolar junction transistor. The npn bipolar junction transistor would be configured to have the emitter coupled to the sense resistor with the collector to base shorted together and connected to R15. The use of similar npn transistors for both the sense transistor Q1A and the thermal tracking transistor Q1B allows for the transistors to be matched very closely when co-packaged because they are made at the same time. This also makes the initial base-emitter voltage of both devices almost identical, thereby reducing an initial error of the sensed current. The sense transistor Q1A and the thermal tracking transistor Q1B can be provided on the same surface mount device to provide improved thermal tracking between the p-n junction of the thermal tracking transistor Q1B and the base-emitter junction of the sense transistor Q1A.

The driver circuit 100 includes other components/devices to provide various functionality for the driver circuit 100. For instance, diodes D2 and D3 are included to provide overvoltage protection for the driver circuit. Other suitable components can be included without deviating from the scope of the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A driver circuit for a light emitting diode (LED) assembly, comprising:
    a rectifier circuit configured to rectify an AC power source into a DC power source providing a DC source voltage;
    a voltage boost circuit configured to boost the DC source voltage to a drive voltage for the LED assembly; and
    a current sense circuit configured to drive a switching element of the voltage boost circuit, the current sense circuit including (i) a sense transistor configured to control switching of said switching element based on a voltage across at least one sense resistor and (ii) a feedback loop configured to provide hysteretic control of the voltage boost circuit;
    wherein the current sense circuit comprises a thermal tracking transistor coupled to the sense transistor.

2. The driver circuit as in claim 1, wherein the thermal tracking transistor compensates for current drift resulting from temperature changes at the current sense transistor.

3. The driver circuit as in claim 2, wherein the thermal tracking transistor compensates for current drift resulting from temperature changes at a base-emitter junction of the current sense transistor.

4. The driver circuit as in claim 1, wherein a base and a collector of the thermal tracking transistor are shorted together.

5. The driver circuit as in claim 4, wherein the base and collector of the thermal tracking transistor are coupled to the at least one sense resistor and an emitter of the thermal tracking transistor is coupled to a base of the sense transistor.

6. The driver circuit as in claim 1, wherein the sense transistor and the thermal tracking transistor are npn bipolar junction transistors.

7. The driver circuit as in claim 1, wherein the sense transistor is an npn bipolar junction transistor and the thermal tracking transistor is a pnp bipolar junction transistor.

8. The driver circuit as in claim 1, wherein the sense transistor and the thermal tracking transistor are disposed in a single surface mount device.

9. The driver circuit as in claim 1, wherein the current sense circuit is coupled to said switching element of said voltage boost circuit through a latching circuit and a buffer circuit.

10. A driver circuit for driving a light source, the driver circuit comprising:
    a rectifier circuit configured to rectify an AC power source into a DC power source providing a DC source voltage;

a filter configured to filter the DC source voltage;
a voltage boost circuit configured to boost the DC source voltage to a drive voltage for the light source, the voltage boost circuit comprising a switching element, an inductive element, and a diode; and
a current sense circuit configured to drive the switching element of the voltage boost circuit, the current sense circuit including (i) a sense transistor configured to control switching of said switching element based on a voltage across at least one sense resistor and (ii) a feedback loop configured to provide hysteretic control of the voltage boost circuit;
wherein the sense transistor has a reference input coupled to a base of the sense transistor, the reference input comprising the sense resistor and a thermal tracking transistor, the thermal tracking transistor configured to compensate for current drift in a base-emitter junction of said sense transistor.

11. The driver circuit as in claim 10, wherein a base and a collector of the thermal tracking transistor are shorted together.

12. The driver circuit as in claim 11, wherein the base and the collector of the thermal tracking transistor are coupled to the at least one sense resistor and an emitter of the thermal tracking transistor is coupled to a base of the sense transistor.

13. The driver circuit as in claim 10, wherein the switching element comprises a field effect transistor.

14. The driver circuit as in claim 13, wherein said current sense circuit is configured to drive a gate of said field effect transistor.

15. The driver circuit as in claim 14, wherein said current sense circuit is coupled to the gate of said field effect transistor through a latching circuit and a buffer circuit.

16. The driver circuit as in claim 10, wherein the light source comprises a plurality of light emitting diodes.

17. A light emitting diode (LED) assembly, comprising:
an LED array comprising a plurality of LEDs connected in series for providing illumination; and
a driver circuit for driving said LED array, said driver circuit including:
a rectifier circuit configured to rectify an AC power source into a DC power source providing a DC source voltage;
a filter configured to filter the DC source voltage;
a voltage boost circuit configured to boost the DC source voltage to a drive voltage for the LED array; and
a current sense circuit configured to drive a switching element of the voltage boost circuit, the current sense circuit including (i) a sense transistor configured to control switching of said switching element based on a voltage across at least one sense resistor, (i) a thermal tracking transistor coupled to a base of said sense transistor, and (iii) a feedback loop configured to provide hysteretic control of the voltage boost circuit.

18. The LED assembly as in claim 17, wherein a reference input is provided to the base of said sense transistor.

19. The LED assembly as in claim 17, wherein the thermal tracking transistor is configured to compensate for current drift resulting from temperature in a base-emitter junction of said sense transistor.

20. The driver circuit of claim 1, wherein the feedback loop extends from an output of the current sense circuit to an input terminal of the sense transistor.

* * * * *